United States Patent [19]

Beitler et al.

[11] 4,322,761
[45] Mar. 30, 1982

[54] TAPE GUIDE IN A HELICAL SCAN CASSETTE RECORDER

[75] Inventors: Franz Beitler; Gerhard Maryschka; Heinrich Schuster, all of Vienna, Austria

[73] Assignee: U.S. Philips Corporation, New York, N.Y.

[21] Appl. No.: 206,583

[22] Filed: Nov. 13, 1980

Related U.S. Application Data

[63] Continuation of Ser. No. 36,729, May 7, 1979, abandoned.

[30] Foreign Application Priority Data

May 5, 1978 [AT] Austria .................................. 3278/78

[51] Int. Cl.³ .............................................. G11B 15/66
[52] U.S. Cl. .............................................. 360/85
[58] Field of Search .......................................... 360/85

[56] References Cited

U.S. PATENT DOCUMENTS 3,512,694  5/1970  Sugaya et al. .
3,871,025  3/1975  Nakamoto ........................ 360/85

*Primary Examiner*—Robert S. Tupper
*Attorney, Agent, or Firm*—David R. Treacy

[57] ABSTRACT

A helical scan cassette tape recorder including tape guide means for pulling part of the tape out of the cassette and laying it on a surface of the recorder drum. The guide means includes a curved guide rail and a support which moves on the rail along a curved path defined by the rail and carries a tape guide element which engages the tape during threading and operation. Grooves in the rail may cause the support to tilt during its longitudinal movement on the rail.

12 Claims, 6 Drawing Figures

TAPE GUIDE IN A HELICAL SCAN CASSETTE RECORDER

This is a continuation of application Ser. No. 036,729, filed May 7, 1979 now abandoned.

BACKGROUND OF THE INVENTION

The invention relates to an apparatus for recording and/or playing back signals on a magnetic tape carried on two rotatable spools in a cassette. The invention relates particularly to a recording and/or playback apparatus of the kind (hereinafter referred to as "a helical scan recorder") comprising a deck plate, at least one drive spindle for driving one of the spools in the cassette to wind the tape onto that spool and unwind it from the other spool, means for supporting the cassette on the deck plate in a position such that the spool to be driven is coaxial with the drive spindle, a rotary magnetic recording and/or playback head supported for rotation relative to the deck plate, a guide drum for the tape, which drum is supported on the deck plate with its axis coinciding with the axis of rotation of the rotary magnetic head, and tape guide means for pulling part of the tape between the spools out of the cassette and laying it in the cylindrical surface of the guide drum and for subsequently guiding the tape along a helical path around part of said surface of the drum so that the rotary magnetic head can record and/or playback signals on the tape which are arranged in tracks extending obliquely relative to the longitudinal direction of the tape.

The term "guide drum" is to be understood herein to include a drum composed of separate coaxial parts.

In a known helical scan recorder which is described in U.S. Pat. No. 3,660,614, a guide slot is formed in a base plate to define a guide path for a tape guide element which pulls part of the tape out of the cassette and lays it on the surface of the guide drum. It has been found to be of particular importance that the tape guide arrangement ensures that the magnetic tape is guided along a path such that, when the tape is pulled out of the cassette and is laid on the surface of the guide drum, the tape guide element exerts no irregular forces on the tape. Such an arrangement prevents deformation of the tape, which is apt to occur in particular at the edges. Therefore, jerky movements of the tape guide element should also be avoided. These requirements cannot be met, or can be met only inadequately, by means of a guide slot formed in a base plate.

SUMMARY OF THE INVENTION

According to the present invention the tape guide means in a helical scan recorder comprise a tape guide element which is engageable with the tape and which, during a threading operation of the tape guide means to pull part of the tape out of the cassette and lay it on the cylindrical surface of the guide drum, moves along a guide path which is at least partly curved and which is defined by a guide rail mounted on the deck plate, the tape guide element being carried by a support which is movable along the guide rail.

In one embodiment of the invention the distance of the guide path from a plane perpendicular to the axis of the drive spindle varies over at least part of the length of the guide path so that in this part the path extends obliquely relative to the deck plate.

In a preferred embodiment, the support of the tape guide element includes a carriage of U-shaped cross-section, having two side portions which adjoin a central portion and which are situated on opposite sides of the guide rail.

Preferably, at least one pin projects inwardly from the inner side of one of the side portions of the carriage and engages slidably in a longitudinal guide groove in the facing side of the guide rail.

According to a first preferred embodiment, two longitudinally spaced pins project from the inner side of one of side portions of the carriage and engage slidably in a longitudinal guide groove in the facing side of the guide rail, the pins thus being aligned in the direction of movement of the carriage along the rail, and a single pin projects from the inner side of the other side portion of the carriage and engages slidably in a guide groove in the corresponding facing side of the guide rail, the latter guide groove also extending longitudinally of the rail and the single pin being situated in a traverse plane which lies between the two pins.

In a second preferred embodiment, two longitudinally spaced pins project from the inner side of one of the side portions of the carriage and engage slidably in two respective parallel guide grooves in the facing side of the guide rail, the grooves extending longitudinally in the direction of movement of the carriage along the rail, and a single pin projects from the inner side of the other side portion of the carriage and engages slidably in a corresponding longitudinal guide groove in the adjacent facing side of the guide rail, the single pin again being situated in a transverse plane between the two pins.

In a different aspect of the invention, the end of each pin which engages in a respective guide groove may be shaped like a ball. Further, each pin may be connected to the respective side portion of the carriage by means of a screwthreaded connection so that the distance through which the pin projects inwardly from the respective side portion can be adjusted.

BRIEF DESCRIPTION OF THE DRAWING

A helical scan recorder according to embodiments of the invention in which the tape guide arrangement includes two movable tape guide elements will now be described with reference to the accompanying drawings, in which.

DESCRIPTION OF THE PREFERRED EMBODIMENT

Figure 1:
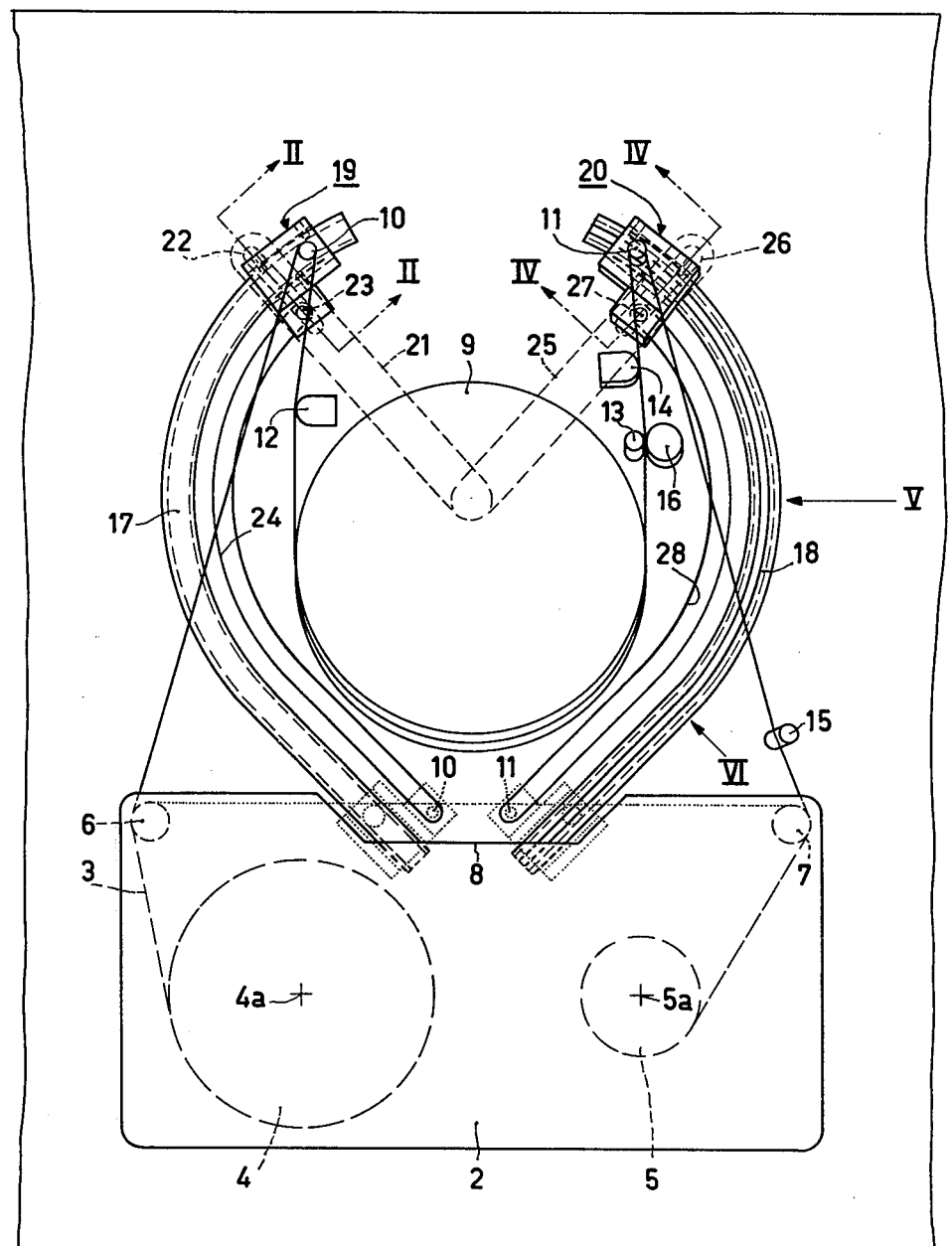
FIG. 1 is a plan view of those parts of the apparatus which are relevant to the invention.

Referring first to FIG 1, the tape handling mechanism of a helical scan video recorder is shown, having a deck plate 1 on which is disposed a cassette 2 which contains a magnetic tape 3 carried on two spools 4 and 5 which are rotatable about parallel axis 4a and 5a respectively. The spools may be formed with or without flanges. When the apparatus is in operation the tape is unwound from one spool and wound onto the other. When the cassette is not in use, a part of the tape which extends between two guide rollers 6 and 7 in the cassette passes across an opening 8 in the cassette housing, as indicated by the dotted line 3a in FIG. 1. This part of the tape 3 has to be pulled out of the cassette 2 and laid on the cylindrical surface of a guide drum 9 mounted on the deck plate 1. At this location rotary magnetic heads (not shown), which are coaxial with the drum 9 and which are supported for rotation relative to the deck plate, cooperate with the tape in the operation of the apparatus. For pulling the tape out of the cassette and laying it on the surface of the guide drum 9, two tape guide elements in the form of pins 10 and 11 each move along an associated guide path from a rest position, in which the pins extend behind the tape 3 at the location of the opening 8 in the cassette housing, into an operating position. In FIG. 1 these two tape guide pins 10 and 11 are represented by uninterrupted lines in the operating position and by broken lines in the rest position. The part of the tape 3 which is pulled out of the cassette and laid on the surface of the guide drum is also represented by uninterrupted lines.

When the tape guide pins 10 and 11 are in the operating position, the tape 3 extends from the guide roller 6 in the cassette, around the tape guide pin 10, past an erase head 12, around the guide drum 9 and the rotating magnetic heads, past a tape drive capstan 13 and a playback head 14, around the tape guide pin 11 and past a guide pin 15 to the guide roller 7 in the cassette. For driving the tape 3, a pressure roller 16 presses the tape against the capstan 13. A drive spindle (not shown) is provided for driving the spool onto which the tape is to be wound. Means not shown are provided for supporting the cassette on the deck plate in a position such that this spool is coaxial with the drive spindle. The guide drum 9, the capstan 13, the playback head 14, the tape guide pin 11 and the guide pin 15 are arranged obliquely relative to the deck plate in such positions that the tape travels along a helical path around part of the cylindrical surface of the guide drum and is subsequently returned into the cassette. The guide path for the tape guide 10 should be parallel to the deck plate 1 because the tape 3 travels from the cassette 2 to the guide drum 9 in directions which are parallel to the deck plate. The tape guide pin however, should be guided from the rest position into the operating position along a path which is oblique relative to the deck plate because the tape 3 leaves the guide drum 9 in a direction which is oblique relative to the deck plate 1 and, after passing round the tape guide pin 11, moves gradually upwards in the direction of the cassette. The guide path for the pin 11 also twists about its longitudinal axis so that the tape guide pin 11 is tilted to one side as it travels along the guide path. As can be seen from FIG. 1, the guide paths for the tape guide pins 10 and 11 are at least partly curved and extend partly around the guide drum 9.

The guide paths for the tape guide pins 10 and 11 are defined by guide rails 17 and 18 respectively, which are secured fixedly to the deck plate 1 by screws 17A and 18A respectively. The tape guide pins 10 and 11 are carried by supports constituted by carriages 19 and 20 respectively which are slidable along the rails 17 and 18 respectively. The carriage 19 is moved by means of a pivotable arm 21 which is situated below the deck plate and which has a slot 22 which engages a pin 23 extending downwardly from the carriage 19, which pin is movable in a slot 24 formed in the deck plate 1 adjacent the guide rail 17. In a similar way the carriage 20 is moved by means of a pivotable arm 25 which has a slot 26 which engages a pin 27 extending downwardly from the carriage 20, which pin is movable in a slot 28 formed in the deck plate 1 adjacent the guide rail 18. The carriages 19 and 20 are moved along the guide rails 17 and 18 by pivoting the arms 21 and 25 respectively. The carriages may alternately be moved by means other than those shown, for example by means of a cable.

Figure 2:
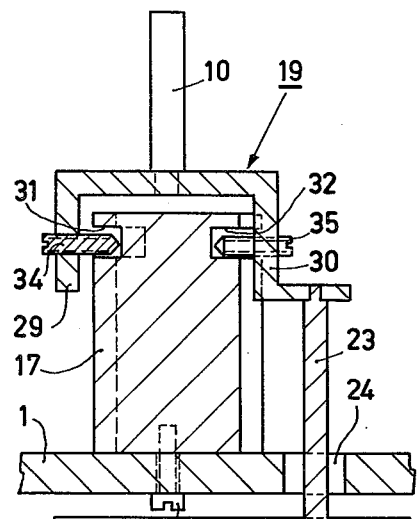
FIG. 2 is a sectional view, taken on the line II—II in FIG. 1, of one of the tape guide elements and the associated guide rail.
Figure 3:
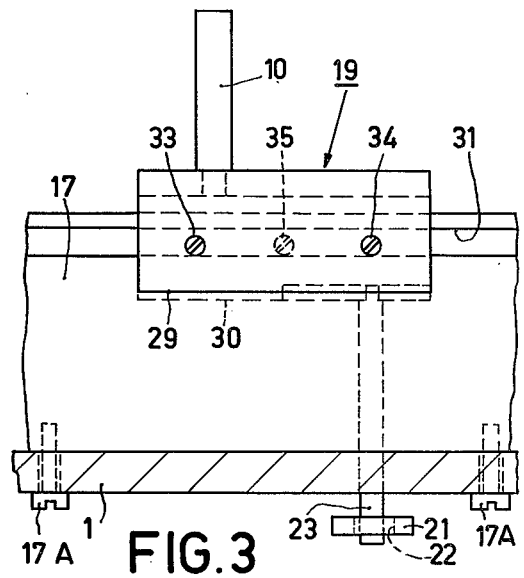
FIG. 3 is a side view of the tape guide element and guide rail shown in FIG. 2.

As can be seen from FIGS. 2 and 3, the carriage 19 for the tape guide pin 10 has a U-shaped cross-section and has side portions 29 and 30 which adjoin a central portion and which extend downwardly at opposite sides of the guide rail 17, which has a rectangular cross-section. The guide rail 17 has longitudinally extending guide grooves 31 and 32 in its sides, and engaging slidably in these grooves are pins which project inwardly from the inner sides of the side portions 29 and 30 of the carriage 19. In the present example two pins 33 and 34 extend from the side portion 29 into the guide groove 31, and from the side portion 30 one pin 35 extends into the guide groove 32. The pins 33 and 34 which extend from the side portion 29 are spaced longitudinally from each other in the direction of movement of the carriage 19 along the guide rail 17, and the pin 35 which is connected to theeside portion 30 is situated in a transverse plane which lies between the two pins 33 and 34. In this way three-point guiding is provided for the carriage 19, ensuring perfect alignment of the carriage along the guide rail 17.

The pins 33, 34 and 35 are connected to the side portions 29 and 30 of the carriage 19 by screw-threaded connections so that the distance from the free end of each pin to the respective side portion 29 or 30, and thus the penetration depth of the pin into the respective guide groove 31 and 32, can readily be adjusted. Furthermore, the free ends of the pins 33, 34 and 35 are pointed so as to minimize friction if the free end of any of the pins contacts the bottom of the respective guide groove. Furthermore, the clearances between the side portions 29 and 30 of the carriage 19 and the guide rail 17 and between the pins 33, 34 and 35 and the walls of the guide grooves 31 and 32 are adapted to the curvature of the rail 17 so that the carriage can be moved along the guide rail in a smooth and uniform manner. If desired, the shape of the side portions 29 and 30 of the carriage may also be adapted to the curvature of the guide rail 17. The side portions 29 and 30 need not extend the whole length of the carriage; the side portion 30 may be a narrow portion of sufficient width for the connection thereto of the pin 35, and the side portion 29 may be divided into two such narrow portions to which the pins 33 and 34 can be connected.

As previously stated, the carriage 20 for the tape guide pin 11 has to be moved from the rest position into the operating position in such a way that the distance between the guide path and a plane perpendicular to the axis of rotation of the drive spindle varies, and moreover, when the operating position of the tape guide pin 11 is reached, the pin must have been tilted away from the guide drum 9 so that it occupies the correct position oblique to the deck plate 1 for guiding the tape. For this purpose the carriage 20, as it is moved along the guide rail 18, should perform a tilting movement. This tilting movement is obtained through the shape of the guide path defined by guide grooves in the rail 18, as will now be described.

Figure 4:
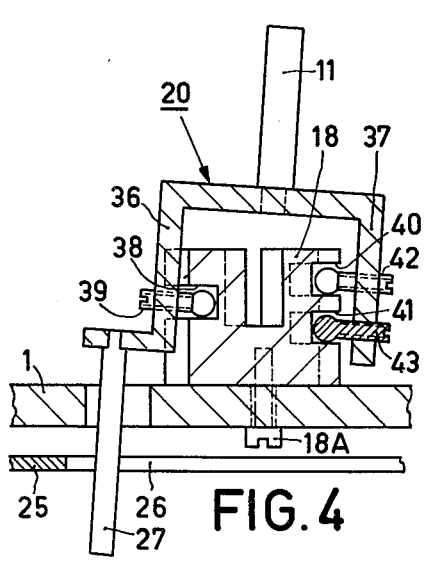
FIG. 4 is a sectional view, taken on the line IV—IV in FIG. 1, of the other tape guide and associated guide rail.
Figure 5:
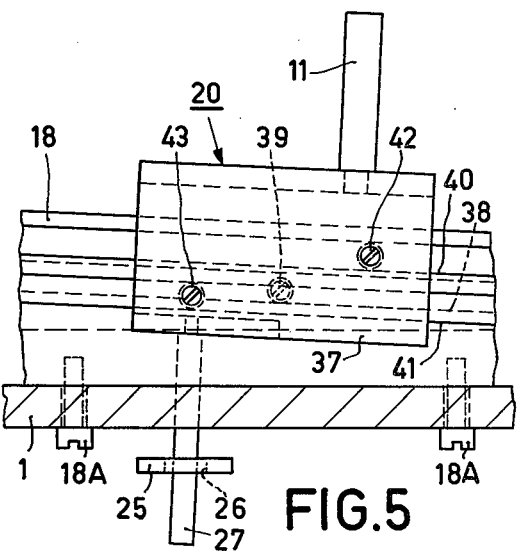
FIG. 5 shows the tape guide element of FIG. 4 in side view at a position on the associated guide rail which is indicated by the arrow V in FIG. 1.
Figure 6:
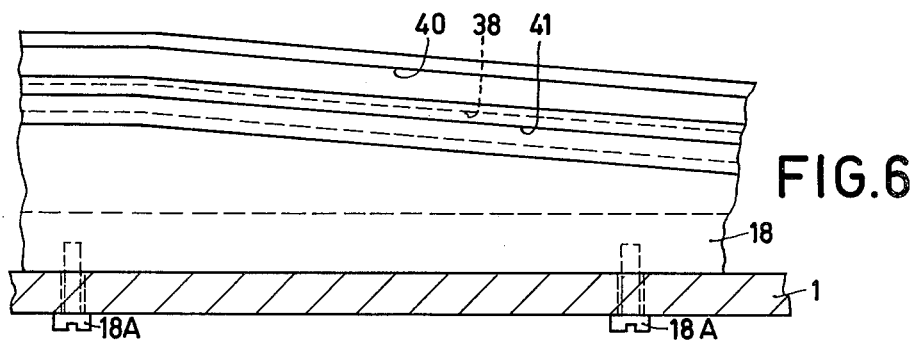
FIG. 6 is a side view of the guide rail of FIGS. 4 and 5 at the location indicated by the arrow VI in FIG. 1.

As shown in FIGS. 4, 5 and 6, the height of the guide rail 18, which has a U-shaped cross-section, relative to the deck plate 1 decreases from the location indicated by the arrow VI in FIG. 1 to the location of the section shown in FIG. 4. The carriage 20 has a U-shaped cross-section and has side portion 36 and 37 situated one on each side of the guide rail 18. Projecting from the inner side of the side portion 36 is a pin 39 which engages slidably in a longitudinally extending guide groove 38 in the adjacent side of the guide rail 18. Two pins 42 and 43 project from the inner side of the side portion 37 and engage slidably in two respective parallel longitudinally extending guide grooves 40 and 41 in the adjacent side of the rail 18. The two pins 42 and 43 are spaced longitudinally from each other in the direction of movement of the carriage 20 along the guide rail 18 and are situated at different levels relative to the guide rail to suit the spacing between the two guide grooves 40 and 41. The pin 39 is situated in a transverse plane which lies between the two pins 42 and 43. In this way particularly reliable three-point guiding for the carriage 20 is provided, which guiding also allows the carriage to be tilted to one side. In conformity with the decreasing height of the guide rail 18 the guide grooves 40, 41 and 38, viewed from the cassette, also have a downward slope relative to the deck plate 1 so that the required gradual descent of the carriage 20 to the operating position of the tape guide pin 11 is obtained. The guide groove 38, however, has a less steep downward slope than the guide grooves 40 and 41. This is apparent from FIG. 6, wherein the guide groove 38 is disposed near the level of the guide groove 41, and from FIG. 4, where the guide groove 38 is situated at a level approximately midway between the guide grooves 40 and 41. This results in the carriage 20 being tilted about an axis extending in the longitudinal direction of the guide rail 18, as is shown in FIG. 4, so that the tape guide pin 11 performs a tilting movement away from the guide drum 9 as it moves from the rest position into the operating position, the tilting movement being adapted so that the tape 3 is pulled out of the cassette 2 and laid on the guide drum 9 as gently as possible and without deformation. The guide grooves in the rail 18, which together define the guide path for the tape guide pin 11, can be shaped to produce any desired movement of the pin 11. As is shown in FIG. 4, the pins 39, 42 and 43 are also secured in the side portions 36 and 37 of the carriage 20 by screw-threaded connections so as to enable the penetration depth of the pins into the guide grooves to be readily adjusted. In the first example the free end of each of the guide pins is shaped like a ball so that a uniform movement of the carriage along the guide rail 18 is ensured despite the tilting movement of the carriage. The free ends of the pins 33, 34 and 35 of the carriage 19 may also be ball-shaped. The clearances between side portions 36 and 37 of the carriage 20 and the guide rail 18 and between the pins 39, 42 and 43 and the walls of the guide grooves 38, 40 and 41 are adapted to the curvatures of the rail 18 so that the carriage 20 can be moved along the rail in a smooth and uniform manner. If, required, the depth of the guide grooves may also be varied so as to ensure a reliable three-point guidance in all cases. As the guide grooves in the rail 18 have a comparatively complex shape, the rail is preferably manufactured from a plastic material, so that the desired shape of the guide grooves can be readily obtained. The cross-sectional shape of the guide grooves may also be adapted to other requirements; for example, the grooves may be given a trapezoidal cross-section. The fixing screws 17A and 18A allow the guide rails 17 and 18 to be adjusted slightly relative to the desk plate or, if necessary, to be replaced by other guide rails.

What is claimed is:

1. A helical scan tape cassette recording and/or playback apparatus having a deck plate adapted so that a cassette may be disposed thereon, a cylindrical head drum supported on the deck plate, and tape guide means for guiding a tape along a path on a cylindrical surface of the drum, said means including a tape guide element for engaging a tape in a cassette disposed on the deck plate, pulling part of the tape out of the cassette and laying the tape on the cylindrical surface of the drum,
   wherein the tape guide means includes a guide rail on the deck plate defining a longitudinal at least partly curved guide path, and
   a support mounting said tape guide element, including a carriage having a U-shaped cross-section having a central portion and two side portions adjoining the central portion and situated on opposite sides of the guide rail, arranged for longitudinal movement on the guide rail along said path, and means cooperatively engaging between at least an inner side of one of said side portions and the respective side of said guide rail for positioning said carriage with respect to said rail along at least one direction transverse to said longitudinal movement.

2. An apparatus as claimed in claim 1 wherein said means for positioning cooperatively engages between the inner side of each of said portions and the respective side of the rail, to position the carriage in both directions transverse the longitudinal movement.

3. An apparatus as claimed in claim 1 wherein said means for positioning cooperatively engages between the inner side of each of said side portions and the respective side of the rail, and said means for positioning further includes means for tilting the carriage about an axis perpendicular to said longitudinal movement as said carriage is moved along said rail.

4. An apparatus as claimed in claim 1, wherein said cooperatively engaging means includes at least one pin projecting inwardly from an inner side of one of said side portions, and the guide rail has a longitudinal guide groove in the side facing said one side portion, the pin engaging slidably in the groove.

5. An apparatus as claimed in claim 4 wherein the end of said pin which engages the guide groove is ball-shaped.

6. An apparatus as claimed in claim 4 wherein said pin is connected to the carriage side portion by a screw-threaded connection for adjusting the distance through which the pin projects into the groove.

7. An apparatus as claimed in claim 3, wherein said cooperatively engaging means includes two pins projecting inwardly from an inner side of one of said side portions and the guide rail has a longitudinal guide groove in a side facing said one side portion, said pins engaging slidably in said groove, said pins being spaced longitudinally from one another in the direction of carriage movement along the rail; and the carriage includes a single pin projecting inwardly from the inner side of the other side portion and the guide rail has a longitudinally extending guide groove in an opposite side of the guide rail facing said other side portion, said single pin engaging slidably in said other guide groove in a transverse plane which lies between said two pins.

8. An apparatus as claimed in claim 7 wherein the end of each pin which engages in a respective guide groove is ball-shaped.

9. An apparatus as claimed in claim 8 wherein each pin is connected to the respective carriage side portion by a screw threaded connection so that the distance through which the pin projects from the respective side portion and engages the corresponding groove can be adjusted.

10. An apparatus as claimed in claim 3, wherein said cooperatively engaging means includes two pins projecting inwardly from an inner side of one of said side portions and the guide rail has two longitudinal guide grooves in a side facing said one side portion, said pins engaging slidably in respective grooves, said pins being spaced longitudinally from one another in the direction of carriage movement along the rail; and the carriage includes a single pin projecting inwardly from the inner side of the other side portion and the guide rail has a longitudinally extending guide groove in an opposite side of the guide rail facing said other side portion, said single pin engaging slidably in said other guide groove in a transverse plane which lies between said two pins.

11. An apparatus as claimed in claim 10 wherein the end of each pin which engages in a respective guide groove is ball-shaped.

12. An apparatus as claimed in claim 10 wherein each pin is connected to the respective carriage side portion by a screw threaded connection so that the distance through the pin projects from the respective side portion and engages the corresponding groove can be adjusted.

* * * * *

UNITED STATES PATENT AND TRADEMARK OFFICE
CERTIFICATE OF CORRECTION

PATENT NO. : 4,322,761

DATED : March 30, 1982

INVENTOR(S) : FRANZ BEITLER ET AL

It is certified that error appears in the above—identified patent and that said Letters Patent is hereby corrected as shown below:

On the Title Page: [30] "3278/78" should be --3273/78--.

Signed and Sealed this

Eighth Day of June 1982

|SEAL|

Attest:

GERALD J. MOSSINGHOFF

Attesting Officer — Commissioner of Patents and Trademarks